(12) United States Patent
Green et al.

(10) Patent No.: US 10,543,812 B1
(45) Date of Patent: Jan. 28, 2020

(54) VEHICLE SENSOR

(71) Applicant: Ford Global Technologies, LLC, Dearborn, MI (US)

(72) Inventors: Alfred Green, Belleville, MI (US); David Karl Bidner, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/145,389

(22) Filed: Sep. 28, 2018

(51) Int. Cl.
| | |
|---|---|
| *B60S 1/08* | (2006.01) |
| *H04N 5/225* | (2006.01) |
| *B60R 1/10* | (2006.01) |
| *B60R 1/00* | (2006.01) |
| *G01S 7/481* | (2006.01) |
| *G01S 17/02* | (2006.01) |
| *G01S 17/89* | (2006.01) |
| *B60R 11/00* | (2006.01) |

(52) U.S. Cl.
CPC ............ *B60S 1/0877* (2013.01); *B60R 1/001* (2013.01); *B60R 1/10* (2013.01); *G01S 7/4818* (2013.01); *G01S 17/023* (2013.01); *H04N 5/2254* (2013.01); *B60R 2011/0026* (2013.01); *G01S 17/89* (2013.01)

(58) Field of Classification Search
CPC .............................. B60S 1/0822; G01S 7/4818
USPC .......................................................... 340/905
See application file for complete search history.

(56) References Cited

U.S. PATENT DOCUMENTS

| | | | |
|---|---|---|---|
| 7,034,699 B2 | 4/2006 | Sautter et al. | |
| 9,069,059 B2 | 6/2015 | Vogt et al. | |
| 2001/0028234 A1* | 10/2001 | Banhidy | B60S 1/0818 318/483 |
| 2002/0039065 A1* | 4/2002 | Hsiang | B60R 1/00 340/435 |
| 2002/0172804 A1* | 11/2002 | Sauer | B32B 17/10 428/172 |
| 2003/0155790 A1* | 8/2003 | Noguchi | B32B 17/10036 296/84.1 |
| 2006/0103509 A1* | 5/2006 | Chung | B60Q 9/008 340/425.5 |
| 2013/0265563 A1* | 10/2013 | Vogt | G01S 7/4806 356/4.01 |
| 2018/0088235 A1* | 3/2018 | Haslim | G01S 17/06 |
| 2018/0100929 A1 | 4/2018 | O'Keeffe | |
| 2018/0236930 A1* | 8/2018 | Farges | B60Q 1/2615 |

FOREIGN PATENT DOCUMENTS

CN          207096446 U          3/2018

* cited by examiner

*Primary Examiner* — Fabricio R Murillo Garcia
(74) *Attorney, Agent, or Firm* — Frank A. MacKenzie; Bejin Bieneman PLC

(57) ABSTRACT

A system includes an optical fiber embedded in a windshield. The system includes a reflector embedded in the windshield and oriented to reflect light to a first end of the optical fiber. The system includes a sensor oriented to receive light from a second end of the optical fiber.

19 Claims, 3 Drawing Sheets

VEHICLE SENSOR

BACKGROUND

A vehicle may include a computer that receives data from one or more sensors, such as cameras, light detection and ranging (LIDAR) devices, etc. The data from the sensors may be used by the computer to operate the vehicle, e.g., in an autonomous mode or a semi-autonomous mode.

DETAILED DESCRIPTION

Figure 1:
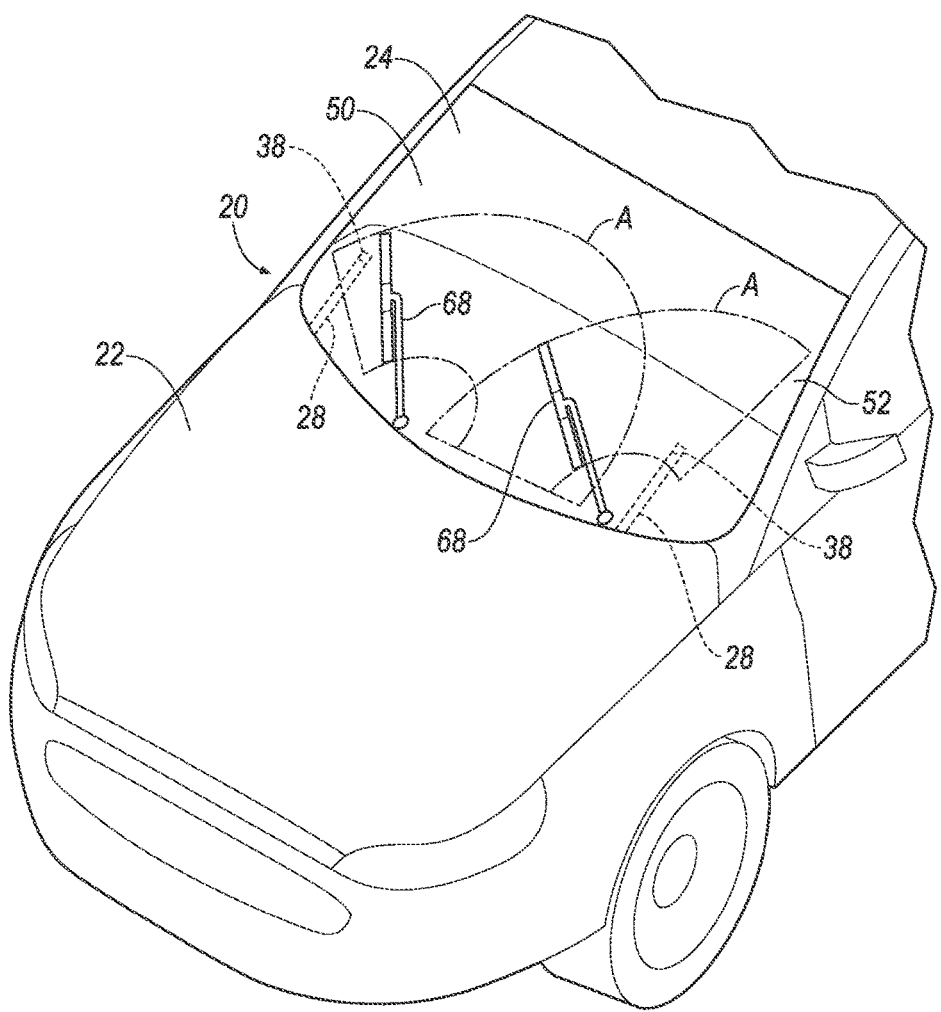
FIG. 1 is an exterior perspective view of a vehicle having an example sensor system optical fiber.

A system includes an optical fiber embedded in a windshield. The system includes a reflector embedded in the windshield and oriented to reflect light to a first end of the optical fiber. The system includes a sensor oriented to receive light from a second end of the optical fiber.

The reflector may be oriented to collect light forward of a vehicle.

The system may include a second reflector oriented to reflect light to the sensor from the second end of the optical fiber.

The second reflector may include a reflective surface and a transmissive surface, whereby light can pass through the second reflector to the second end of the optical fiber.

The system may include a lens arranged between the second end and the second reflector.

The system may include a light emitter oriented to provide light to the second end.

The light emitter may be a laser.

The system may include an instrument panel supporting the sensor.

The sensor may be a camera.

The windshield may include first and second layers, the optical fiber and the reflector between the first and second layers.

The windshield may include a third layer between the first and second layers, the optical fiber surrounded by the third layer.

The system may include a wiper arranged to clear the windshield over the reflector.

The reflector may be at a lower portion of the windshield.

The system may include a second optical fiber embedded in the windshield, and a second reflector embedded in the windshield and oriented to reflect light to the second optical fiber.

The reflector may be on a right portion of the windshield and the second reflector may be on a left portion of the windshield.

The system may include a second sensor oriented to receive light from a second end of the second fiber optic.

A system includes means for transmitting light embedded in a windshield. The system includes a reflector embedded in the windshield and oriented to reflect light to a first end of the means for transmitting light. The system includes means for detecting light oriented to receive light from a second end of the means for transmitting light.

The system may include means for providing light to the second end of the means for transmitting light.

The system may include a second reflector oriented to reflect light to the means for detecting light from the second end of the means for transmitting light.

The system may include means for clearing the windshield forward of the reflector.

With reference to the Figures, wherein like numerals indicate like parts throughout the several views, a sensor system 20 for collecting data to operate a vehicle 22 includes data collecting means packaged or embedded in a windshield 24. Data can thereby be provided to a sensor 42 that is a lidar or other image sensor such as a camera. The system 20 includes means for transmitting light, such as an optical fiber 28, extending between a first end 30 and a second end 32. In the illustrated examples, the optical fiber 28 is embedded in the windshield 24. For example, the means for transmitting light may be disposed between first and second layers 34 of the windshield 24. The system 20 includes means for reflecting light, such as a reflector 38, embedded in the windshield 24 and oriented to reflect light L (shown in FIG. 2) to the first end 30. The system 20 include means for detecting light, such as a sensor 42, oriented to receive light L from the second end 32.

The system 20 protects and supports the reflector 38 and the optical fiber 28 within the windshield 24, e.g., providing packaging to the reflector 38 and the optical fiber 28 and provides for collection and detection of light L via the windshield 24 without the need of additional support structures, e.g., fixed to the windshield 24 or vehicle frame.

The adjectives "first," "second," etc., are used throughout this document as identifiers and are not intended to signify importance or order. In the following description, relative orientations and direction (by way of example, top, bottom, forward, rearward, front, back, left, right, etc.) are relative to a perspective of an occupant seated in a driver seat, facing a dashboard of the vehicle 22, relative to an orientation of controls for operating the vehicle 22, e.g., a steering wheel, etc., relative to a driving direction of the vehicle 22 when wheels of the vehicle 22 are parallel to each other, etc. Orientation and direction relative to the system 20 are given related to when the system 20 is supported by the vehicle 22 as described below and shown in the figures.

The vehicle 22 may be any type of passenger or commercial automobile such as a car, a truck, a sport utility vehicle, a crossover vehicle, a van, a minivan, a taxi, a bus, etc. The vehicle 22 may operate in an autonomous mode, a semi-autonomous mode, or a non-autonomous mode. For purposes of this disclosure, an autonomous mode is defined as one in which each of a propulsion system, a braking system, and a steering system are controlled by a computer; in a semi-autonomous mode the computer controls one or two of the propulsion system, the braking system, and steering system; in a non-autonomous mode, a human operator controls the propulsion system, the braking system, and the steering.

Figure 3:
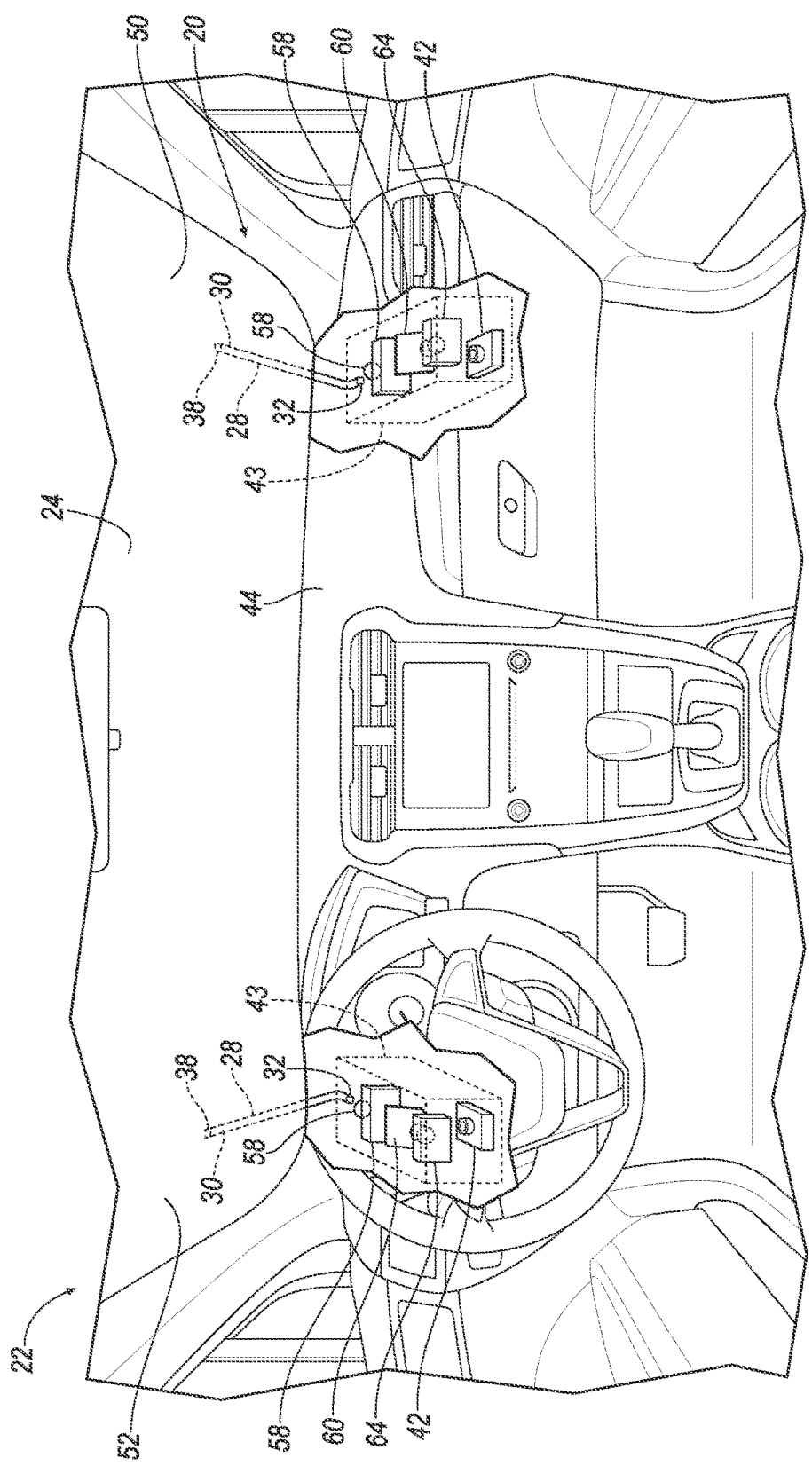
FIG. 3 is an interior perspective view of the vehicle illustrating the example sensor system.

The vehicle 22 may include an instrument panel 44. The instrument panel 44 may be disposed at a forward end of a passenger cabin and face toward the front seats. The instrument panel 44 may include vehicle controls, including the steering wheel. FIG. 3 shows a cutaway of the instrument panel 44, showing elements of the system 20 therein.

The vehicle 22 may include sensors 42. The sensors 42 may detect the external world, for example, radar sensors, scanning laser range finders, light detection and ranging (LIDAR) devices, and image processing sensors such as cameras. The sensors 42 may be in communication with the computer.

The sensors 42 may be supported by the instrument panel 44 of the vehicle 22, or at any other suitable location that protects the sensors 42 from elements and other debris outside the vehicle 22. For example, one or more sensors 42 may each be disposed within a housing 43. The housing 43 may be fixed to the instrument panel 44, e.g., with a fastener or other structure. For example, the sensors 42 and/or housing 43 may be fixed within the instrument panel, e.g., to a bottom surface of a top panel of the instrument panel 44. The housing may be plastic, metal, etc. Supporting the sensors 42 within the instrument panel 44 reduces a length of the optical fiber 28 and reduces a complexity of assembling the system 20, e.g., as compared to supporting the sensor 42 elsewhere on the vehicle 22.

The windshield 24 protects an interior of the vehicle 22, e.g., from the elements and other debris. The windshield 24 is transparent, e.g., such that occupants of the vehicle 22 may see therethrough. The windshield 24 may be supported by the vehicle 22 at the forward end of the passenger cabin, a rearward end of the passenger cabin, etc. The windshield 24 includes first and second layers 34 of laminate transparent material. The first and second layers 34 may be glass or any other suitable transparent material to provide a rigid barrier to protect the interior of the vehicle 22. The windshield 24 further includes a third layer 46. The third layer 46 is between the first and second layers 34. The third layer 46 holds the first and second layers 34 together, e.g., when the windshield 24 is cracked, shattered or otherwise damaged. The third layer 46 may be plastic, such as polyvinyl butyral (PVB) or ethylene-vinyl acetate (EVA), or any other suitable material for holding the first and second layers 34 together.

The system 20 can include one or more optical fibers 28 that each have a first end 30 and a second end 32. For example, one optical fiber 28 may be on a right portion 50 of the windshield 24, e.g., closer to a right side of the windshield 24 and/or the vehicle 22 than a left side of the windshield 24 and/or the vehicle 22, and another optical fiber 28 may be on a left portion 52 of the windshield 24, e.g., closer to the left side of the windshield 24 and/or the vehicle 22 than the right side of the windshield 24 and/or the vehicle 22. The optical fiber 28 can receive light L at the first end 30 and transmit light L to the second end 32, and vice-versa. The optical fiber 28 includes one or more transparent fibers, e.g., plastic, glass, or any other suitable material for transmitting light as described herein. The transparent fibers may include a core surrounded by a transparent cladding material with a lower index of refraction than the core. Light is kept in the core by the phenomenon of total internal reflection which causes the transparent fiber to act as a waveguide. As an alternative or in addition to the optical fiber 28, means for transmitting light can include any other suitable structure for transmitting light L between ends 30, 32.

The optical fiber 28 is embedded in the windshield 24. For example, the optical fiber 28 may be disposed between the first and second layers 34 of the windshield 24. The optical fiber 28 may be surrounded by the third layer 46, e.g., the third layer 46 may be over-molded to surround the optical fiber 28.

The reflectors 38 receive light L that originated outside, e.g., forward of, the vehicle 22, and are oriented to reflect light L toward the optical fiber 28, e.g., the first end 30. As used herein, oriented to reflect light L toward the optical fiber 28 means the reflector 38 is positioned such that light L traveling at a specified angle relative to the windshield 24 and/or vehicle 22, e.g., within a horizontal arc of +/−45 degrees and a vertical arc of +/−25 degrees of directly forward of the vehicle 22, is reflected by the reflector 38 to the first end 30 of the optical fiber 28. The reflector 38 may be a mirror, a prism or lens having a reflective surface, etc. Collecting light L forward of the vehicle 22 allows light to be provided to one or more sensors 42 as data to detect objects such as obstacles, road markings, etc., in front of the vehicle 22. The reflector 38 may be glass, metal, plastic, or any suitable material or combination of materials that can reflect light.

The reflector 38 is disposed between the first and second layers 34 of the windshield 24, e.g., the reflector 38 is between the first and second layers 34 of the windshield 24. For example, the reflector 38 may be supported by the third layer 46. The third layer 46 may surround the reflector 38. For example, the third layer 46 may be over-molded around the reflector 38. The reflector 38 may be connected to the first end 30 of the optical fiber 28.

The reflector 38 may be at a lower portion 48 of the windshield 24, i.e., closer to a bottom of the windshield 24 than a top of the windshield 24. The reflector 38 at the lower portion 48 of the windshield 24 reduces a length of optical fiber 28 for transmitting light L, e.g., when the optical fiber 28 provides light L to a sensor 42 supported by the instrument panel 44.

Multiple reflectors 38 may be supported by the windshield 24. For example, one reflector 38 may be on the right portion 50 of the windshield 24 and direct light to the optical fiber 28 on the right portion 50, and another reflector 38 may be on the left portion 52 of the windshield 24 and direct light to the optical fiber 28 on the left portion 52. The reflectors 38 on the right portion 50 and the left portion 52 can provide collection of light L that may be used for binocular image analysis.

The system 20 includes one or more image sensors 42, e.g., a lidar or a camera. The sensors 42 provide digital data rendered according to received light L, e.g., a lidar point cloud or one or more images or frames of data comprising multiple pixels. A sensor 42, is oriented to receive light L from the second end 32 of the optical fiber 28. Multiple sensors 42 may be used, e.g., one sensor 42 oriented to receive light L from the second end 32 of the optical fiber 28 that receives light L from the reflector 38 on the right portion 50 of the windshield 24 and another sensor 42 oriented to receive light L from the second end 32 of the optical fiber 28 that receives light L from the reflector 38 on the left portion 52 of the windshield 24.

The sensor 42 may be oriented to receive light L directly from the second end 32 of the optical fiber 28, i.e., without any lenses, reflectors, etc. therebetween. For example, the sensor 42 may be supported at a location relative to the second end 32 such that light L may travel without changing direction from the second end 32 to the sensor 42.

Figure 2:
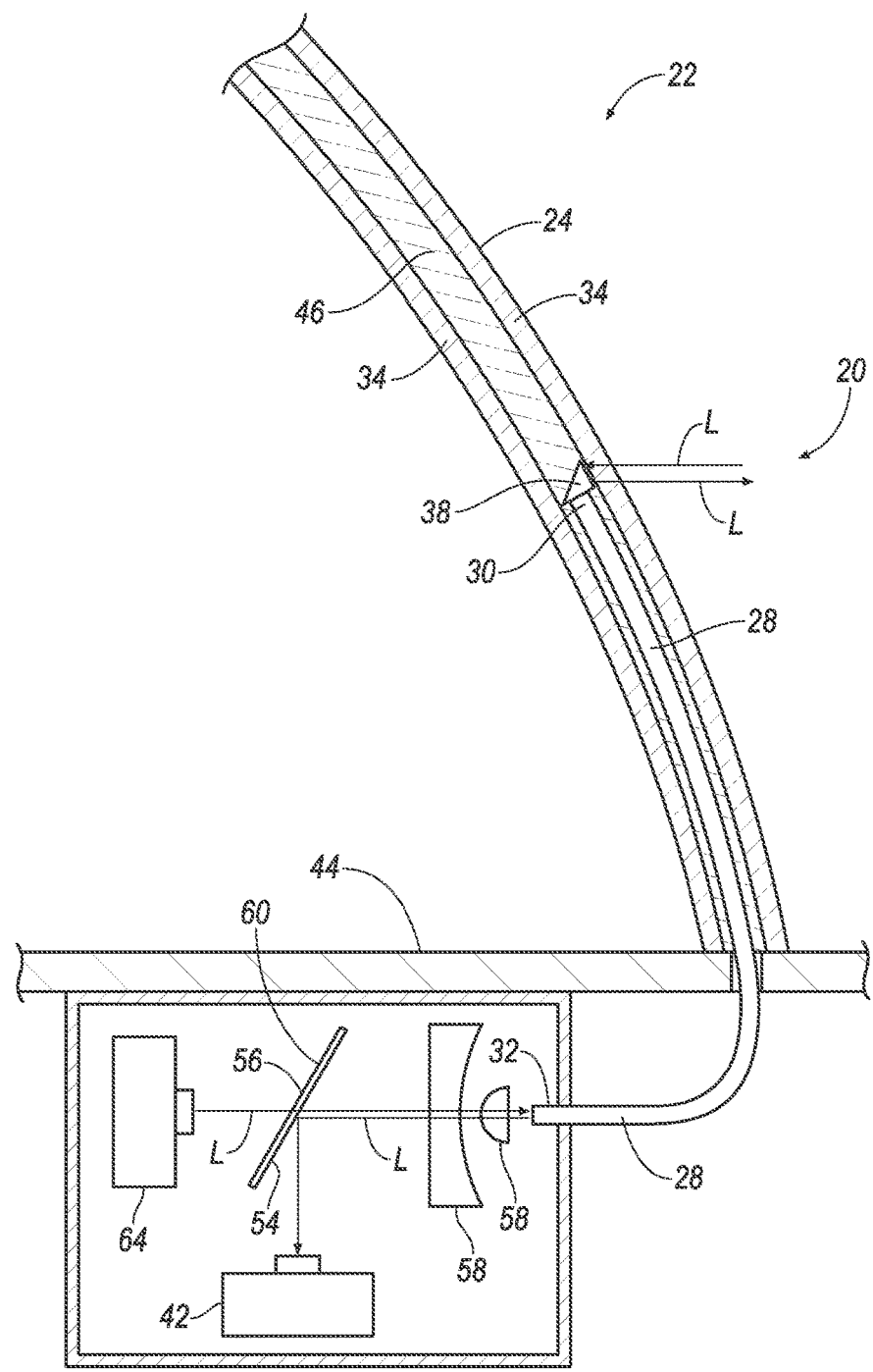
FIG. 2 is a cross section of the vehicle including the system of FIG. 1.

Alternatively, as illustrated in FIG. 2, the system 20 may include a second reflector 60 oriented to reflect light L from the second end 32 of the optical fiber 28 to the sensor 42. The second reflector 60 may have a reflective surface 54 and a transmissive surface 56. The reflective surface 54 reflects light L, e.g., received from the second end 32 toward the sensor 42. The transmissive surface 56 is arranged to permit light L to pass therethrough, e.g., light L received by the transmissive surface 56 may pass through the second reflector 60 to the second end 32. For example, the second reflector 60 may be a one-way mirror, a half-silvered mirror, etc.

One or more lenses 58 may be arranged between the second end 32 of the optical fiber 28 and the second reflector 60. The lenses 58 focus light L from the second end 32 of the optical fiber 28 on the sensor 42, e.g., via the second reflector 60. The lenses 58 may be concave, convex, etc. The lenses 58 may be glass, plastic, or any suitable material. The lenses 58 may be fixed and/or movable relative to the sensors 42.

The system 20 may include a light emitter 64. The light emitter 64 can provide light L to the second end 32. The light emitter 64 can be a device that converts electricity into light L, e.g., a light emitting diode that generates infrared light, a laser, etc. For example, the light emitter 64 can be a component of a lidar sensor.

The light emitting device 64, may be oriented to provide light L to the transmissive surface 56 of the reflector 38. For example, light L from the light emitting device 64 may travel from the light emitting device 64 to the transmissive surface 56 of the second reflector 60. Such light L may pass through reflector 38 to the second end 32 of the optical fiber 28.

The system 20 may include means for clearing the windshield 24 such as a wiper 68 activated and controlled as part of a conventional vehicle windshield wiper system, for example. The wiper 68 can remove or remediate the presence of contaminants, such as water, dirt, etc., from the windshield 24 to allow (or better allow) light L to pass therethrough. The wiper 68 may actuate, e.g., a servo motor or the like may be connected to the wiper 68, to wipe the windshield 24 in front of the reflector 38. In other words, the wiper 68 may actuate to clear an area A (see FIG. 1) of the windshield 24, and the reflectors 38 may be in such area A.

Light L generated by the light emitter 64 may pass through the transmissive surface 56 of the second reflector 60, through the lenses 58, and to the second end 32 of the optical fiber 28. Such light L may then pass though the optical fiber 28, out of the first end 30 to the reflector 38. The reflector 38 may reflect the light L forward of the vehicle 22. Such light L may be reflected off an object outside the vehicle 22 back towards the reflector 38. The light L may then be reflected from the reflector 38 to the first end 30 of the optical fiber 28, pass thought the optical fiber 28, and travel out the second end 32. From the second end 32, the light L may pass through the lenses 58 and be reflected by the reflective surface 54 of the second reflector 60 the sensor 42. Data from the sensor 42 regarding the light L received by sensor 42, e.g., an amount of time between generation of the light L by the light emitting device 64 and subsequent detection of such light L by the sensor 42, may be used by the computer to navigate the vehicle 22, e.g., in the semi-autonomous mode and/or the autonomous mode.

Computing devices, such as the computer, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.).

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system, comprising:
   an optical fiber embedded in a windshield;
   a reflector separate from the optical fiber and also embedded in the windshield and oriented to reflect incoming light to a first end of the optical fiber; and
   a sensor oriented to receive the reflected incoming light from a second end of the optical fiber;
   wherein the windshield is built of first and second layers, the optical fiber and the reflector being embedded between the first and second layers.

2. The system of claim 1, wherein the reflector is oriented to collect light forward of a vehicle.

3. The system of claim 1, further comprising a second reflector oriented to reflect light to the sensor from the second end of the optical fiber.

4. The system of claim 3, wherein the second reflector includes a reflective surface and a transmissive surface, whereby light can pass through the second reflector to the second end of the optical fiber.

5. The system of claim 3, further comprising a lens arranged between the second end of the optical fiber and the second reflector.

6. The system of claim 1, further comprising a light emitter oriented to provide light to the second end of the optical fiber.

7. The system of claim 6, wherein the light emitter is a laser.

8. The system of claim 1, further comprising an instrument panel supporting the sensor.

9. The system of claim 1, wherein the sensor is a camera.

10. The system of claim 1, wherein the windshield includes a third layer between the first and second layers, the optical fiber surrounded by the third layer.

11. The system of claim 1, further comprising a wiper arranged to clear the windshield over the reflector.

12. The system of claim 1, wherein the reflector is at a lower portion of the windshield.

13. The system of claim 1, further comprising a second optical fiber embedded in the windshield, and a second reflector embedded in the windshield and oriented to reflect light to the second optical fiber.

14. The system of claim 13, wherein the reflector is on a right portion of the windshield and the second reflector is on a left portion of the windshield.

15. The system of claim 13, further comprising a second sensor oriented to receive light from a second end of the second optical fiber.

16. A system, comprising:
means for transmitting light embedded in a windshield;
a reflector separate from the means for transmitting light and also embedded in the windshield and oriented to reflect incoming light to a first end of the means for transmitting light; and
means for detecting light oriented to receive the reflected incoming light from a second end of the means for transmitting light;
wherein the windshield is built of first and second layers, the means for transmitting light and the reflector being embedded between the first and second layers.

17. The system of claim 16, further comprising means for providing light to the second end of the means for transmitting light.

18. The system of claim 16, further comprising a second reflector oriented to reflect light to the means for detecting light from the second end of the means for transmitting light.

19. The system of claim 16, further comprising means for clearing the windshield forward of the reflector.

* * * * *